United States Patent
Watts

(10) Patent No.: US 6,506,042 B1
(45) Date of Patent: *Jan. 14, 2003

(54) ROUNDER BAR WITH FLOATING FOOT

(75) Inventor: James L. Watts, Norcross, GA (US)

(73) Assignee: Camtech, LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/553,233

(22) Filed: Apr. 19, 2000

Related U.S. Application Data

(63) Continuation-in-part of application No. 09/183,740, filed on Oct. 30, 1998, now abandoned.

(51) Int. Cl.⁷ ............................................. A21C 11/00
(52) U.S. Cl. ................... 425/332; 425/333; 425/364 R
(58) Field of Search ................................ 425/168, 332, 425/333, 364 R, 364 B

(56) References Cited

U.S. PATENT DOCUMENTS

| | | | |
|---|---|---|---|
| 4,008,025 A | 2/1977 | Campbell | 425/96 |
| 4,306,850 A | 12/1981 | Cummins | 425/332 |
| 4,346,205 A | 8/1982 | Hiles | 528/53 |
| 4,565,250 A | 1/1986 | Vasko | 168/12 |
| 4,683,709 A | 8/1987 | Vasko et al. | 54/66 |
| 4,777,739 A | 10/1988 | Hiles | 36/43 |
| 4,808,469 A | 2/1989 | Hiles | 428/318.6 |
| 5,264,232 A | 11/1993 | Campbell | 426/503 |
| 5,270,070 A | 12/1993 | Campbell | 426/503 |
| 5,356,652 A | 10/1994 | Campbell | 426/503 |
| 5,528,348 A | * 6/1996 | Miwa et al. | 355/211 |
| 5,714,178 A | 2/1998 | Keener | 425/333 |
| 6,159,517 A | * 12/2000 | Watts et al. | 426/496 |

* cited by examiner

Primary Examiner—Jan H. Silbaugh
Assistant Examiner—Donald Heckenberg
(74) Attorney, Agent, or Firm—Thomas, Kayden, Horstemeyer & Risley

(57) ABSTRACT

A rounder bar assembly (10) with floating foot (56) for use with an endless belt conveyor (12) incorporates an elongated body (20) configured for shaping dough pieces (14) transported along the endless belt of a conveyor. A backing plate (22) and a spacer (24) are disposed between the body (20) and the backing plate, with the body (20), backing plate (22) and spacer (24) defining cavity (26) therebetween. An elongated flexible foot (56) is movably mounted within the cavity (26) so that a portion of the foot (56) extends from the cavity when the foot is in a compressed position. A visco-elastic material (63) is disposed within the cavity (26) between the spacer (24) and the foot (56) such that the visco-elastic material is responsive to movement of the foot, thereby allowing the foot to conform to the belt of the conveyor. The visco-elastic material has a property of expanding volumetrically in response to a force applied thereto that displaces some of the volume of the material.

10 Claims, 4 Drawing Sheets

ROUNDER BAR WITH FLOATING FOOT

CROSS REFERENCE

This is a continuation-in-part of U.S. patent application Ser. No. 09/183,740, filed in the U.S. Patent and Trademark Office on Oct. 30, 1998, now abandoned.

FIELD OF THE INVENTION

The present invention relates to bakers' dough processing equipment. More specifically, the invention relates to an improved rounder bar for converting pieces of dough divided from streams of dough into rounded spherical pieces or dough balls as the pieces of dough are conveyed along a surface conveyor of a dough processing path.

DESCRIPTION OF THE PRIOR ART

In a typical commercial bread making process, baker's dough, which is primarily made of flour and water, is blended in a large mixer. A particularly high water content usually is desirable in the dough composition formed in the mixer because a high water content tends to make a softer baked product. Gluten, which is a component of flour, absorbs and retains the water which is added to the mixer so that a dough of a sticky paste-like consistency is made. After mixing, the sticky dough is then transferred to a stuffing pump which forms the dough into a stream or moving bar that passes through a conduit to dough processing equipment. The processing equipment can include, among others, a dough distribution manifold which distributes the stream of dough into multiple streams of dough, a dough divider which divides the dough streams into pieces of dough of equal volume and deposits the dough pieces onto a continuous moving conveyor belt of a surface conveyor for further processing along a processing path.

Due to compressing, shearing and cutting action inherent in the dough dividing process, divided dough pieces tend to lose a portion of their gas which forms in the dough and which allows the dough to rise. Accordingly, each dough piece must be allowed to regain some of the gas lost during the dividing process. Therefore, a dough piece typically is rounded immediately after being divided in order to acquire a desired spherical shape and in order to develop an outer skin on the dough piece which will retain freshly produced gas. The outer skin also provides the benefit of reducing the stickiness of the dough piece, thereby providing a dough piece which is better suited for processing by dough processing equipment.

Typically, divided dough pieces are delivered by gravity to the upper surface of an endless belt-type conveyor which is provided with a plurality of stationary rounder bar assemblies which are positioned parallel to each other and extending along the length of the belt and which are angularly offset from the direction of travel of the belt. Rounder bar assemblies of this type are disclosed in U.S. Pat. Nos. 4,008,025, 4,306,850, 5,264,232, 5,270,070, 5,356,652, and 5,714,178. Each of the rounder bar assemblies has a concave shaping surface extending angularly along the direction of travel of the belt and facing the on-coming dough pieces. Each of the concave shaping surfaces form elongated pockets or tunnels with the belt for contacting and shaping the surfaces of the dough pieces as the dough pieces are moved along the rounder bar by the conveyor belt. During the rounding of dough pieces, it is desirable to maintain each rounder bar in light continuous contact along its full length with the belt. If contact between the round bar and the belt is excessive, friction can create undesirable heat and can be destructive to the belt. If, however, there are gaps between a rounder bar and the belt, a dough piece can be subject to a nibbling action resulting in some of the dough leaking between the rounder bar and the belt and the spherical dough pieces becoming unequal in size.

Additionally, it is desirable to have the belt of the conveyor kept as flat as possible during the processing of dough pieces so that a rounder bar can more easily conform to the shape of the belt. In order to form the upper surface of the conveyor belt as flat as possible, some prior art conveyors incorporate flat belt support sheets or beds formed of substantially rigid sheet metal which are mounted below the belt and in support relationship with the belt so that the lower surface of the belt contacts and slides on the upper surface of the bed. However, belts can incorporate a seam where the ends of the belt are joined together, thereby creating a hump or raised segment in the belt. Therefore, most rounder bar assemblies are likely to have difficulty in forming a continuous seal against the moving surface of the conveyor belts.

When a dough piece is dropped on the surface of a conveyor and contacts the concave shaping surface of a rounder bar, the resistance applied by the rounder bar to the dough piece causes the dough piece to decelerate from the speed of the belt and to rotate on both the surface of the rounder bar and on the surface of the conveyor. This behavior is caused by the frictional engagement of the outer surface of the dough piece with the shaping surface of the rounder bar and causes the dough piece to take on an approximately round shape, flattened only where it contacts the belt, as the dough piece is forced to rotate about various axes while passing down the length of the rounder bar. However, since the dough piece is no longer traveling at belt speed, the dough piece is rolled and reoriented along the belt as the dough piece engages the rounder bar, usually allowing the dough piece to roll over any portion of the belt that has a hump or a trough. However, due to the inability of the prior art rounder bar assemblies to fully conform to humps or troughs in the surface of the conveyor belt, dough from a dough piece can leak between the lower edge of the stationary rounder bar and the facing surface of the moving conveyor belt as the dough piece is reoriented along the belt.

As shown in U.S. Pat. No. 4,306,850, some rounder bar assemblies incorporate a flexible foot member which is telescopically disposed within a slot formed along the bottom edge of the rounder bar so that the foot extends downwardly from the rounder bar for contacting the conveyor belt. A biasing means in the form of a strip of silicon sponge rubber is disposed within the slot behind the foot and urges the foot into contact with the conveyor belt. Additionally, a series of adjustable fasteners, such as screws, are connected to the foot and slide through the rounder bar at intervals along the length of the rounder bar for providing adjustment of the downward force of the foot against the conveyor belt. So configured, the foot can be positioned with a suitable amount of pressure applied against the belt while the silicon sponge rubber allows the foot to retract within the slot of the rounder bar in response to a raised segment of the conveyor belt passing along the length of the foot.

Although these rounder bar assemblies have increased the efficiency of dough processing, the prior art floating foot still allows an undesirable amount of dough to leak between the rounder bar assemblies and the moving belt. This is due to an inability of the floating foot to conform to troughs in the conveyor belt which typically reside on opposite sides or adjacent a raised segment of the belt. As a raised segment and its associated troughs pass beneath the foot of a rounder bar, the raised segment contacts the foot and causes the foot to exert an increased upward force against the sponge rubber located thereabove, thereby urging that portion of the foot to retract within the rounder bar slot and allowing that portion of the foot to conform to the upper portion of the raised segment of the belt. However, the troughs located adjacent the raised segment typically are concavically shaped segments of the belt surface which the foot bridges or spans without fully conforming thereto. Simply stated, the sponge rubber biased foot tends to adequately bias a raised portion of the foot downwardly against a raised portion of the belt surface but does not apply adequate downward force to an adjacent portion of the raised foot to urge the foot into the adjacent recess or trough of the belt surface.

In an attempt to correct this problem, it has been standard practice to lower the rounder bar assemblies against the conveyor belt, thereby compressing the sponge rubber, until a sufficient downward force was developed between the foot and belt so that the foot would conform to the shape of a passing trough. However, this practice can result in more downward force being exerted upon the belt when a raised segment passes beneath the foot and also can require a significant amount of adjustment in order to maintain the position of the foot relative to the belt so that the foot can conform to a trough while preventing the foot from fully compressing or "bottoming out" the sponge rubber in response to a raised segment of the belt. If, however, the sponge rubber were to fully compress, damage to the rounder bar and/or the conveyor can result.

Therefore, an object of the present invention is to provide an improved rounder bar which is adapted to conform along its full length with the upper surface of a conveyor belt.

Another object of the present invention is to provide an improved rounder bar which is capable of conforming to both raised portions and troughs which can form in the upper surface of a conveyor belt as they pass beneath the foot of the rounder bar.

Other objects, features and advantages of the present invention will become apparent upon reading the following specification, when taken in conjunction with the accompanying drawings.

SUMMARY OF THE INVENTION

Briefly stated, the present invention comprises an improved rounder bar having a body with a floating flexible foot which bears against and conforms to the shape of the upper surface of a moving conveyor belt. In a preferred embodiment, the body of the rounder bar incorporates an elongated downwardly facing cavity or slot extending along the length of the rounder bar. The foot, formed of flexible material, is configured for being telescopically received in the slot of the rounder bar body with the upper portion of the foot being vertically movably retained within the slot of the rounder bar body so that the foot can move between a low, extended position, with the lower portion of the foot in contact with a low spot on the upper surface of the conveyor belt, and a high, compressed position, with the foot retracting upwardly into the slot when the foot contacts a high spot on the conveyor belt.

The upper portion of the slot, above the foot, is filled with a visco-elastic material which, like a hydraulic material, possesses the physical characteristic of direct compression forces applied to it inwardly through its mass so that there is an equal movement of some other portion of the mass in response to the compression applied to the material. Particular care is given to encase the visco-elastic material within the slot about all surfaces of the material, including adjacent the upper surface of the flexible foot in a fixed volume and to minimize the volume of any air that might be trapped between the material and the facing surfaces of the slot and the upper surface of the flexible foot. This encasement of the visco-elastic material avoids the material from expanding in any direction except to push against and displace the floating flexible foot. So configured, when a segment of the flexible foot is urged against a raised segment of the belt passing therebelow and the raised segment of the belt raises a segment of the floating foot in the slot of the rounder bar against the visco-elastic material, the remaining visco-elastic material exerts a substantially uniform, corresponding downward force against other segments of the floating foot which, in turn, displaces the other segments of the floating foot downwardly a corresponding amount into engagement with the low spots under the floating foot on the surface of the conveyor. Thus, the visco-elastic material imparts a corresponding downward displacement of the flexible foot which is proportional to the upward displacement, thereby causing the other segments of the floating flexible foot to conform to troughs or recesses formed in the conveyor belt under the foot. This is accomplished without the necessity of increasing downward pressure across the entire length of the rounder bar, such as by lowering the entire bar toward the belt, as is well known in the prior art.

BRIEF DESCRIPTION OF THE DRAWINGS

The accompanying drawings incorporated in and forming a part of the specification illustrate several aspects of the present inventions, and together with the description serve to explain the principles of the inventions. The components in the drawings are not necessarily to scale, emphasis instead being placed upon clearly illustrating principles of the present inventions.

DETAILED DESCRIPTION OF THE PREFERRED EMBODIMENTS

Figure 1:
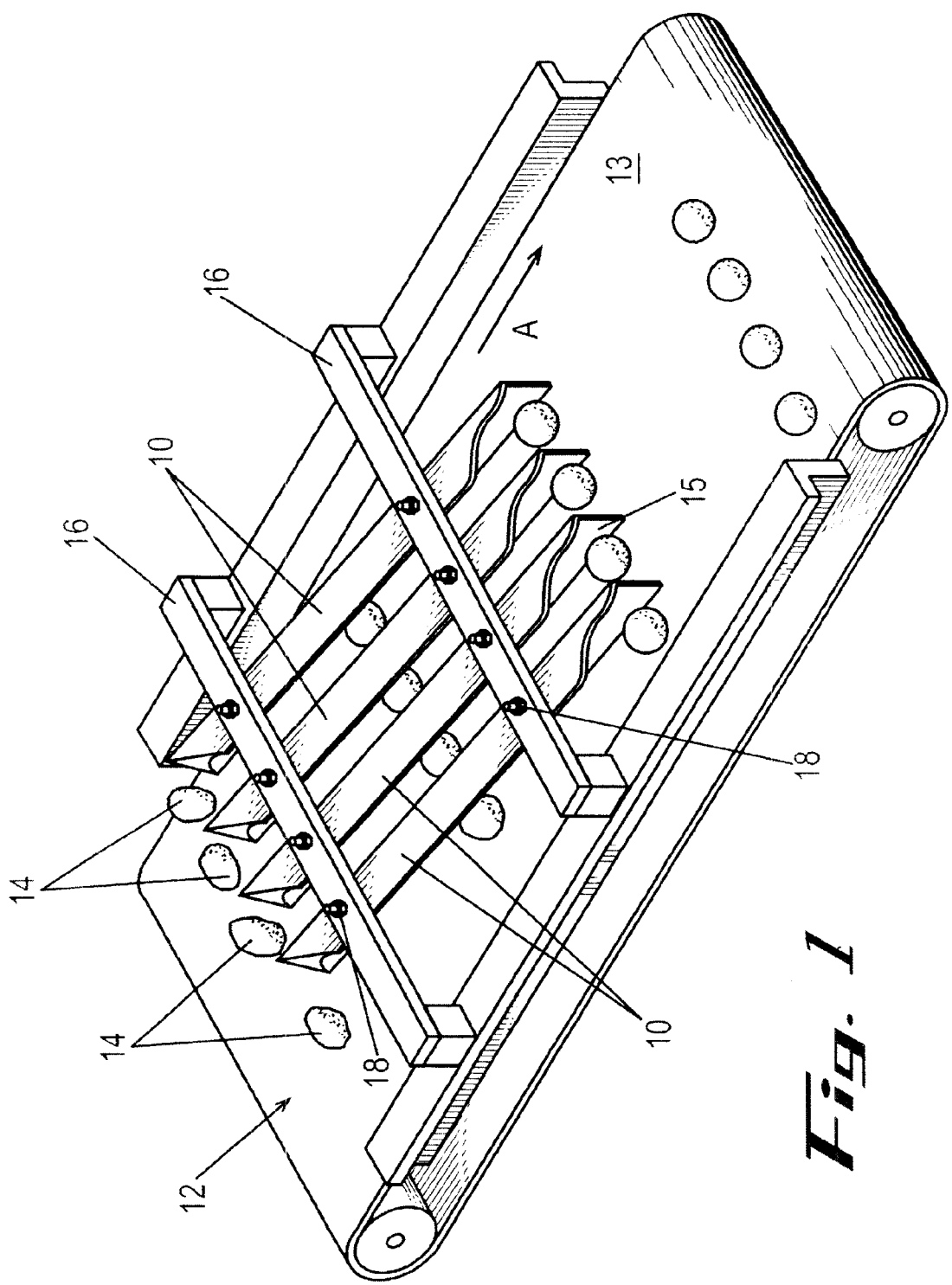
FIG. 1 is a perspective view of a plurality of rounder bar assemblies of the present invention mounted above a representative endless belt type conveyor.

Reference will now be made in detail to the description of the present invention as illustrated in the drawings with like numerals indicating like parts throughout the several views. As shown in FIG. 1, the improved rounder bar assembly 10 of the present invention is typically arranged in a spaced parallel orientation above a surface conveyor 12 with others of the rounder bar assemblies 10. The rounder bar assemblies 10 are disposed parallel to the conveying surface, generally along the length of the conveyor 12 but are angularly offset from the direction of advancement of the belt 13 (direction A). The rounder bar assemblies each have a concave working or contact face 15 that forms an elongated pocket or tunnel with the surface conveyor so that dough pieces 14 being transported along a processing path by the belt 13 are urged into contact with the concave contact face of the rounder bar assemblies 10 for shaping in a conventional manner. The rounder bar assemblies 10 are maintained in the aforementioned orientation by a series of mounting brackets 16 which extend across the conveyor 12 and which each incorporate adjustment mechanisms 18, such as conventional bolt/nut assemblies, which threadedly engage the rounder bar assemblies and the brackets and which allow for vertical and horizontal adjustment of the rounder bar assemblies 10 relative to the upper surface of the belt.

Figure 2:
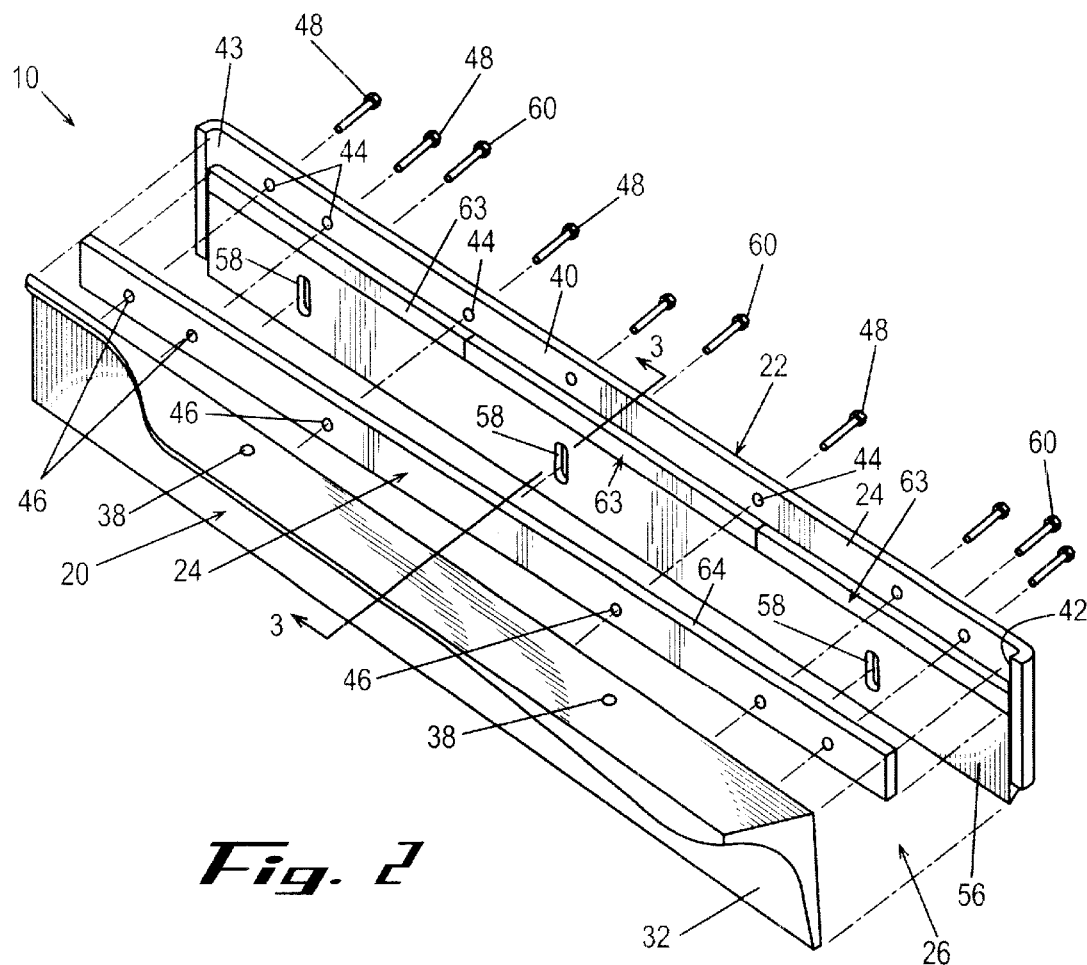
FIG. 2 is a partially exploded, perspective view of the rounder bar assembly.
Figure 3:
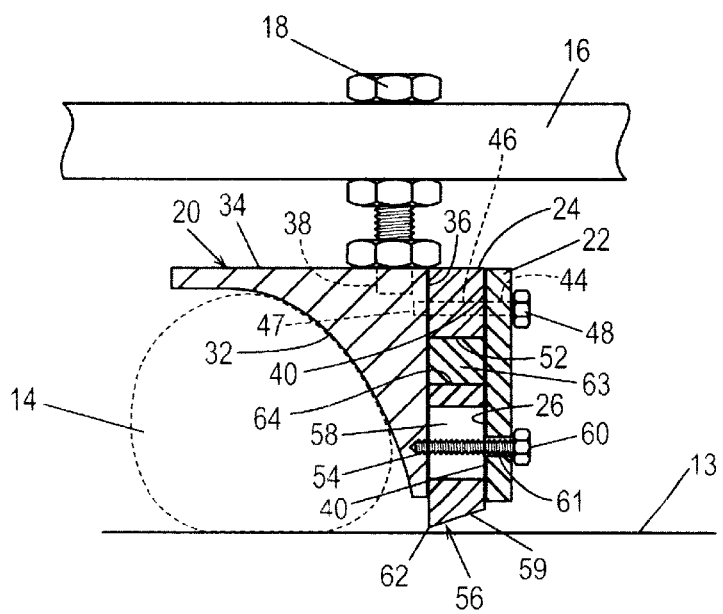
FIG. 3 is a partial cross-sectional view of the embodiment of the rounder bar assembly shown in FIG. 2, taken along section 3—3.
Figure 4:
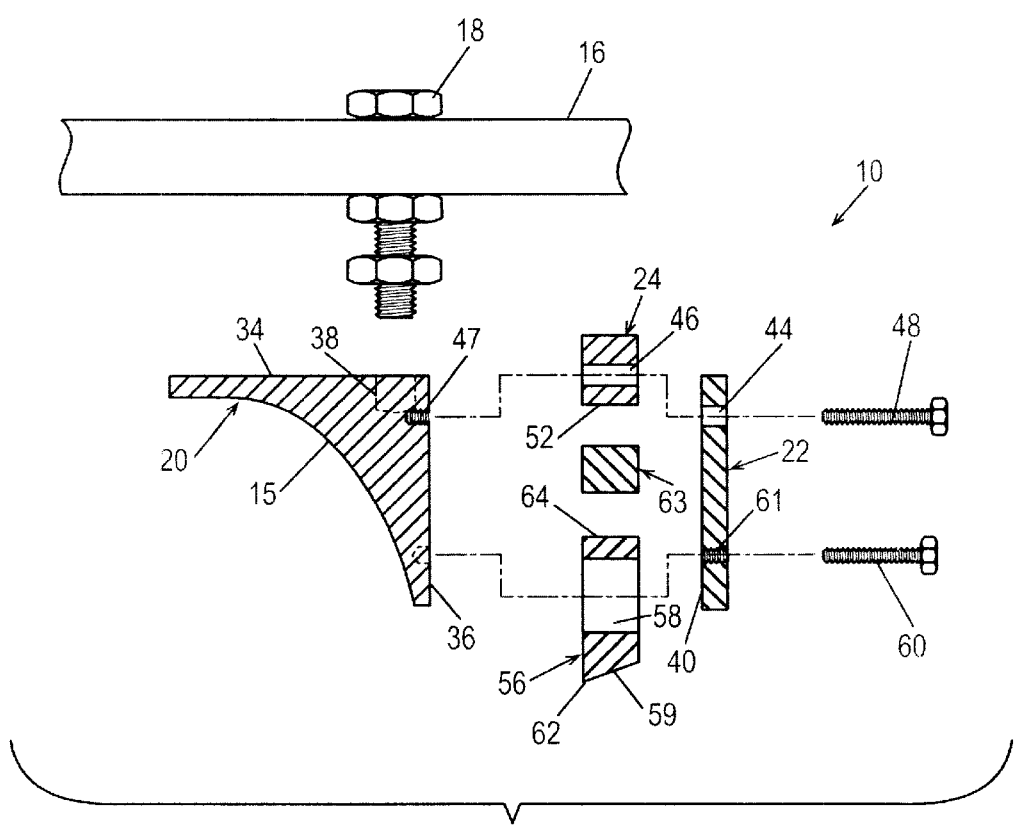
FIG. 4 is an exploded end cross sectional view of the rounder bar assembly of FIG. 3.

As shown in FIGS. 2, 3, and 4, each rounder bar assembly 10 incorporates an elongated rounder bar body 20, a backing plate 22 and a spacer 24 which together cooperate to form an elongated downwardly facing slot or cavity 26 which function as foot support means.

Rounder bar body 20 includes the elongated concave contact face 15, a horizontal mounting face 34 and a vertical rear face 36, with the contact face 15 incorporating a concave shape in cross section for engaging and shaping dough pieces 14 (FIG. 1) as the pieces are drawn down the length of the contact face 15 by the belt 13 of the surface conveyor. Horizontal mounting face 34, at the top of the rounder bar body 20, incorporates internally threaded mounting holes 38 which are adapted to receive adjustment mechanisms 18 and which are provided for mounting the rounder bar body 20 to brackets 16.

As shown in FIG. 2, backing plate 22 includes an inner face 40 and opposing end walls 42 and 43 which extend outwardly from the inner face and close the ends of the elongated slot 26. A series of spaced holes 44 are arranged along the length of and extend horizontally through backing plate 22 and are adapted to align with a series of spaced holes 46 arranged through spacer 24 as well as mounting holes 47 in face 36 of the rounder bar body 20 so that fasteners 48, such as screws, can be placed through aligned holes 44, 46 and 47, and then can be threadedly fastened into each of the holes in vertical rear face 36. So configured, spacer 24 is securely mounted between body 20 and backing plate 22, thereby forming cavity or slot 26 between rear face 36 of rounder bar body 20, inner face 40 of backing plate 22, and lower face 52 of the spacer 24.

An elongated flexible foot 56 is telescopically mounted in the lower portion of the elongated cavity or slot 26 by extending upwardly into the downwardly facing slot and is movably retained therein by a series of vertically oriented slots 58 formed through the foot at intervals along the length of the foot which cooperate with a series of mounts 60, preferably configured as a series of screws spanning the slot 26. In the embodiment of FIGS. 2 and 3, the screws pass through threaded holes 61 formed in the lower portion of backing plate 22 and into the slots 58 of the flexible foot 56 so that the foot is vertically movable about the screws, thereby allowing the foot to be displaced upwardly into the cavity 26. Additionally, the foot 56 incorporates a lower face 59 which is downwardly inclined from the backing plate 22 toward the rounder bar body 20 with the downward most portion forming an elongated toe 62 residing adjacent rear face 36. As such, the toe 60 acts as the preferred point of contact between the rounder bar 10 and the belt 13 of the surface conveyor.

Visco-elastic material 63 is arranged in the upper portion of the cavity 26 and is retained therein by upper face 64 of foot 56, such that upper face 64, lower face 52 of retainer 24, rear face 36 of rounder bar body 20, inner face 40 of backing plate 22, and opposing end walls 42 and 43 of backing plate 22 function as enclosure means closing the visco-elastic material within the cavity or slot 26. In a preferred embodiment, the visco-elastic material 63 is an energy absorbing elastomeric polymeric material of the types described in U.S. Pat. Nos. 4,346,205; 4,683,709; 4,777,739; 4,565,250 and 4,808,469, the disclosures of which are incorporated herein by reference. The material of these patents is sold and is available under the trade name SORBOTHANE®, manufactured by Sorbothane, Inc. of Kent, Ohio. The material responds like a liquid when a force is applied to it, in that it has a property of expanding volumetrically in response to a force applied thereto that displaces some of the volume of the material. Thus, the material is sometimes described as a constant volume solid that acts like a liquid. The visco-elastic material is configured as an elongated strip or strips with adjacent ends of the strips abutting each other, however numerous other configurations can be utilized in order to minimize any air pockets in the cavity 26.

It should be noted that visco-elastic material exhibits some of the same physical characteristics as a liquid, and in particular, the material possesses the ability to transmit pressure exerted on a portion of the material by displacing the pressure in other directions to other pieces of the material and to surfaces which contact the material. This characteristic is extremely beneficial when the material is encased within an enclosure, such as cavity 26, because the encased material behaves similar to a hydraulic system such that any force exerted upon the material is substantially equalized throughout the material and applied to the abutting surfaces.

Figure 5:
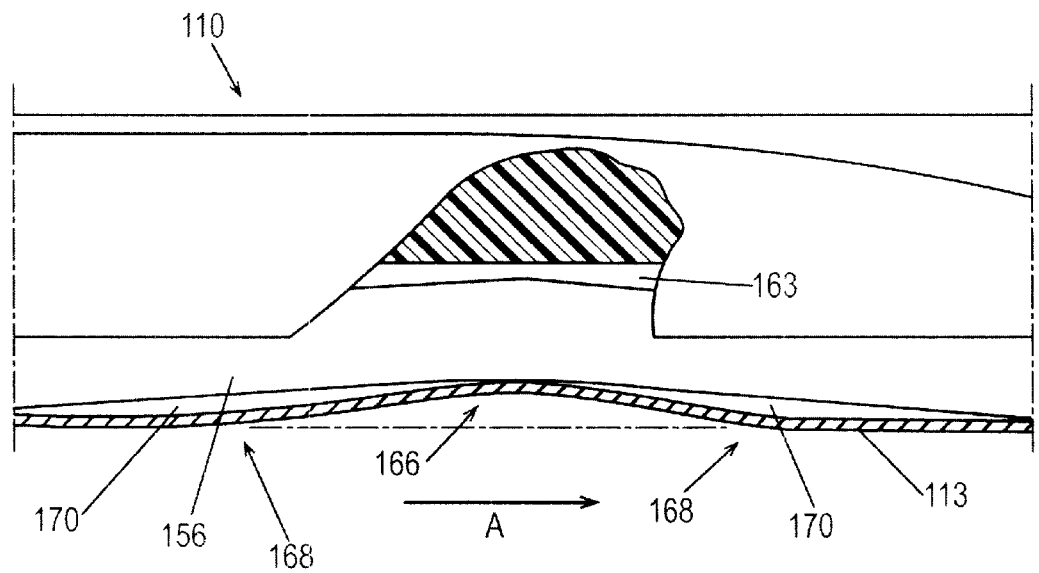
FIG. 5 is a partially cut-away view of a prior art rounder bar assembly, showing detail of the sponge rubber biasing member compressing in response to a hump in conveyor belt as the hump passes below the foot of the bar.

With reference to FIG. 5 which illustrates a prior art rounder for structure, when a prior art rounder bar 110 is placed in contact with a belt 113 of a conveyor, the downward force between the foot 156 and the belt is adjusted by an operator to a desired level in order to minimize dough leakage between the foot and the belt, while taking care not to place too much force on the belt, as previously discussed. Typically, this results in the prior art foot being partially compressed into the cavity with the sponge rubber biasing member 163 being partially compressed from its relaxed state down the entire length of the rounder bar.

As a raised segment or hump 166 in the belt travels along the length of the prior art rounder bar in direction A, the portion of the prior art sponge rubber biasing member 163 residing above the hump is further compressed by a lifting of the intermediate portion of the flexible foot. However, since prior art sponge rubber responds to a localized compression force by compressing or deforming only in the immediate area where the force is imparted, only the portion of the biasing member in the immediate area of the hump further compresses. This allows the segment of the flexible foot 156 residing above the upper portion of the hump to conform to the shape of the upper portion of the hump. However, troughs 168 located adjacent the hump typically are concavically shaped segments of the belt to which the foot 156 would be unable to conform. The prior art foot typically would bridge or span the troughs 168 because only the weight of the segments of the foot residing above the troughs provide a downward biasing force for urging the foot into conformity with the troughs. Therefore, the gap 170 formed between the foot and the belt as the prior art foot spans the trough would allow dough to leak between the foot and the belt as the gap passes a dough ball which is being shaped by the rounder bar.

Figure 6:
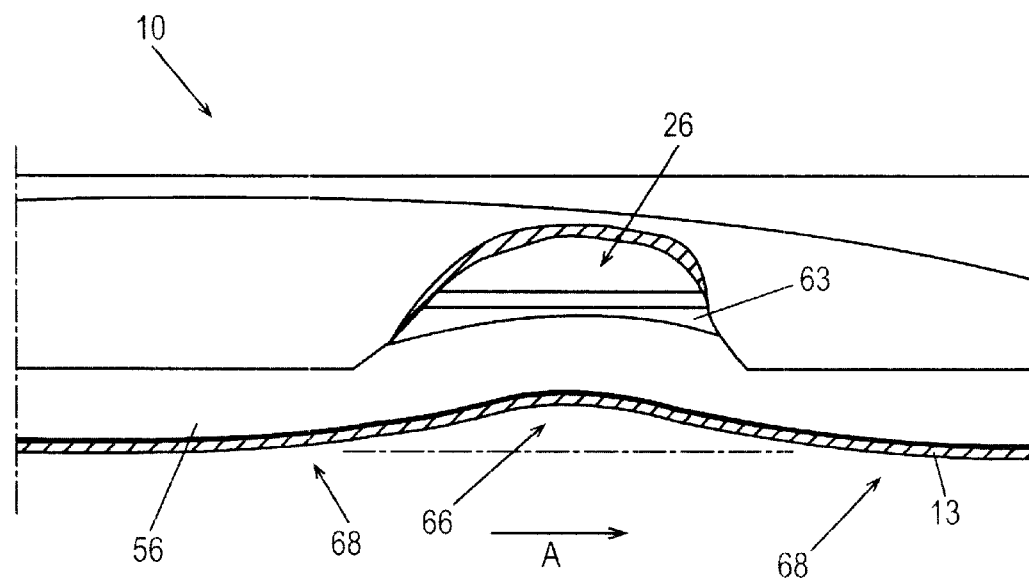
FIG. 6 is a partially cut-away view of the present invention, showing detail of the visco-elastic material compressing as well as downwardly urging pieces of the foot in response to a hump in conveyor belt as the hump passes below the foot of the bar.

With reference to FIG. 6, when a rounder bar 10 of the present invention is placed in contact with a belt 13 of a conveyor, the downward force between the foot 56 and the belt is similarly adjusted by an operator, as previously discussed. This typically results in the foot 56 being partially compressed into the cavity 26 against the visco-elastic material 63 which is being partially compressed from its relaxed state down the entire length of the rounder bar 10.

As a raised segment or hump 66 in the belt travels along the length of the rounder bar 10 in direction A, the segment of the flexible foot riding over the hump flexes upwardly and compresses the adjacent segment of the visco-elastic material 63 residing above the hump. However, since visco-elastic material responds to a localized compression force by displacing the force throughout the entirety of the material, the segment of the visco-elastic material in the immediate area of the hump diminishes in size the other pieces of the material expand a corresponding amount. Since the visco-elastic material 63 is encased within the cavity 26, this action results in a downward movement being directed from the visco-elastic material to the upper surface of the other segments of the entire foot, thereby allowing the segment of the foot 56 residing above the upper portion of the hump 66 to conform to the shape of the upper portion of the hump in the surface conveyor as well as to the shape of the troughs 68 in the surface conveyor. Therefore, The likelihood of a gap being formed between the flexible foot and the upper surface of the belt in the vicinity of the troughs is reduced.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

We claim:

1. A rounder bar assembly with floating foot for use with a conveyor having an endless belt for transporting dough pieces thereon, said rounder bar assembly comprising:

an elongated rounder bar body having a shaping surface and a rear face, said shaping surface configured for shaping dough pieces transported along an endless belt of a conveyor;

a backing plate having an inner face and opposed end walls;

a spacer having a lower face disposed between said rounder bar body and said backing plate such that the rear face of said rounder bar body, the lower face of said spacer, and the inner face and the end walls of said backing plate form therebetween an elongated slot closed at its top, opposed sides and opposed ends and open at its bottom;

an elongated flexible foot sized and shaped to be telescopically received in said slot and having an upper face and a lower face, said foot movably mounted within said slot between a compressed and an extended position such that at least a portion of said foot extends downwardly from said slot and beyond said rounder bar body when said foot is in said compressed position;

a visco-elastic material disposed within and filling said slot between the lower face of said spacer and the upper face of said foot such that said visco-elastic material is responsive to movement of said foot; and said visco-elastic material comprising an energy absorbing elastomeric material of constant volume that in response to a force that reduces the volume of one portion of the material expands the volume of another portion of the material;

so that when a raised segment of an endless conveyor belt passes beneath a first segment of the elongated flexible foot, the first segment of the elongated flexible foot moves upwardly and compresses the volume of the visco-elastic material adjacent the first segment of the elongated flexible foot and the visco-elastic material urges the other portions of the flexible foot downwardly toward engagement with the endless conveyor belt.

2. The rounder bar of claim 1, wherein said flexible foot has a plurality of slots formed therethrough and said backing plate has a plurality of mounts which each slidably engage one of said plurality of slots such that said foot is movable between said compressed and said extended positions as said mounts slide within said plurality of slots.

3. The rounder bar of claim 2, wherein said backing plate has a plurality of holes formed therethrough, each of said holes aligning with one of said plurality of slots of said flexible foot, and wherein said plurality of mounts are screws, each of said screws extending through one of said holes of said backing plate and through one of said plurality of slots of said flexible foot.

4. The rounder bar of claim 1, wherein said visco-elastic material is configured as a single piece of material.

5. The rounder bar of claim 1, wherein said visco-elastic material is configured as a plurality of segments, each of said segments arranged in abutting-relationship with adjacent ones of said segments.

6. A rounder bar assembly for use in combination with a surface conveyor moving along a conveying path of bakery dough make up equipment, comprising:

an elongated rounder bar body having a concave dough shaping surface for cooperating with a surface conveyor to define with the surface conveyor an elongated pocket for shaping dough pieces transported along the surface conveyor, said elongated rounder bar assembly defining a downwardly facing slot extending parallel to the length of said rounder bar body having opposed side walls, opposed end walls and closed top wall and open only along the bottom of said rounder bar body for facing the surface conveyor;

an elongated flexible foot sized and shaped to telescopically extend upwardly into said slot and to extend downwardly from said body toward sealing engagement with the surface conveyor and forming a closed cavity above said flexible foot;

a visco-elastic material filling said cavity above said foot with no air gaps adjacent said visco-elastic material;

whereby when a segment of the elongated flexible foot engages a raised portion of the surface conveyor the segment of the elongated flexible foot riding up over the raised portion of the surface conveyor will move upwardly in the slot and compress the visco-elastic material, and in response to the compression of the visco-elastic material by one segment of the elongated flexible foot the visco-elastic material will urge the other segments of the elongated flexible foot downwardly toward the surface conveyor and into any cavities of the surface conveyor to retard bleeding of dough from dough pieces between the rounder bar and the surface conveyor at the cavities of the surface conveyor.

7. A rounder bar assembly with floating foot for use with a conveyor having an endless belt for transporting dough pieces thereon, said rounder bar assembly comprising:

a body having a concave shaping surface configured for shaping dough pieces transported along an endless belt of a conveyor;

an elongated horizontally extending slot defined by said body having opposed side surfaces, opposed end surfaces and a top surface and a downwardly facing opening with said sides, ends and top forming an unbroken closure about said opening;

an elongated flexible foot sized and shaped to be telescopically received in said slot and having an upper face and a lower face, said foot movably mounted within said slot between a retracted position and an extended position such that at least a portion of said foot extends downwardly from said slot when said foot is in said compressed position, and;

a visco-elastic material completely enclosed within and filling said slot adjacent said foot such that no air gaps are adjacent said visco-elastic material and said visco-elastic material is responsive to movement of said foot and arranged to resist movement of said foot into said slot and having a property of expanding volumetrically in response to a force applied thereto that displaces some of the volume of said visco-elastic material.

8. A scraper assembly for applying continuous contact against an irregular shaped surface as the surface and said scraper assembly move relative to each other, comprising:

a support defining an elongated slot therein, said slot having opposed side walls and opposed end walls, and an interior wall joined together that define an opening and together form an unbroken closure about said opening;

an elongated scraper blade of a size and shape that corresponds to the size and shape of said slot and that is telescopically mounted in said slot and that protrudes from said opening of said slot, said scraper blade being flexible for conforming to the shape of the irregular surface;

a visco-elastic material positioned in said slot adjacent said scraper blade and filling the portion of said slot not occupied by said scraper blade and arranged to resist movement of said scraper blade into said slot, said visco-elastic material having a property of expanding volumetrically in response to a force applied thereto that displaces some of the volume of the visco-elastic material, whereby when a segment of the flexible scraper blade moves inwardly of the slot the visco-elastic material adjacent said segment is compressed and is reduced in volume by the segment of the scraper blade and the visco-elastic material exerts force against and increases in volume adjacent other segments of the flexible scraper blade and moves other segments of the scraper blade outwardly of the slot.

9. The scraper assembly of claim 8, wherein:

said irregular surface comprises a continuous conveyor belt.

10. The scraper assembly of claim 9, wherein:

said support comprises a concave surface for contacting and rolling a work product on said conveyor belt.

* * * * *